United States Patent [19]

Wolcott

[11] 4,194,304

[45] Mar. 25, 1980

[54] LOADER AND RECOIL SIMULATION TRAINER FOR ARTILLERY CREWS

[75] Inventor: Lyle A. Wolcott, East Detroit, Mich.

[73] Assignee: The United States of America as represented by the Secretary of the Army, Washington, D.C.

[21] Appl. No.: 957,121

[22] Filed: Nov. 2, 1978

[51] Int. Cl.[2] .......................... G09B 9/00; F41F 27/00

[52] U.S. Cl. .......................................................... 35/25

[58] Field of Search ............... 35/25, 13; 42/1 A, 1 B; 89/1 R, 1 B, 14 E, 41 R; 273/101.1, 101.2, 101; 124/80, 71, 72, 73, 75, 77

[56] References Cited

U.S. PATENT DOCUMENTS

| | | | |
|---|---|---|---|
| 2,023,497 | 12/1935 | Trammell | 35/25 |
| 2,304,841 | 12/1942 | Mikkelsen | 35/25 |
| 2,375,004 | 5/1945 | Knowles | 35/25 |
| 2,398,813 | 4/1946 | Swisher | 35/25 |
| 2,441,218 | 5/1948 | Bialek | 35/25 |
| 2,674,923 | 4/1954 | Brandt | 35/25 |
| 2,919,628 | 1/1960 | Smith | 89/1 R |
| 3,024,453 | 3/1962 | Ransom | 89/1 R X |
| 3,088,225 | 5/1963 | Amistadi | 35/25 |
| 3,238,642 | 3/1966 | Ohlund | 35/25 |
| 3,334,425 | 8/1967 | Ohlund | 35/25 |
| 3,423,848 | 1/1969 | Ohlund | 35/25 |
| 3,724,438 | 4/1973 | Brandt | 124/59 |
| 3,921,980 | 11/1975 | Artzer | 273/101 |
| 4,050,166 | 9/1977 | Swiatosz et al. | 35/25 |

*Primary Examiner*—Vance Y. Hum

*Attorney, Agent, or Firm*—Nathan Edelberg; Robert P. Gibson; Peter A. Taucher

[57] ABSTRACT

The invention simulates the recoil of artillery to give gun crews in training a more realistic environment than is possible with dummy ammunition. A hydraulic jack, spring-biased in one direction of reciprocation, is connected to move the gun barrel through the recoil-counterrecoil cycle. Electric controls for the hydraulic jack are triggered by the projectile as it exits the barrel, propelled by a greatly reduced powder charge but having a size and weight closely similar to that of a combat round. Thus the system is electric-over-hydraulic. An electric motor-driven pump and an accumulator provide the pressure and solenoid-operated valves control the oil flow. The projectile passes through an electromagnetic coil at the barrel muzzle and triggers the electrical system to initiate oil flow to simulate gun recoil, and oil pressure to the hydraulic jack is closed off when the recoil mechanism trips open a normally closed switch at the end of the recoil movement, whereupon the jack is connected to the tank and the gun is returned to battery by the spring. A pressure-responsive switch closes a circuit to the pump motor to recharge the accumulator.

6 Claims, 4 Drawing Figures

LOADER AND RECOIL SIMULATION TRAINER FOR ARTILLERY CREWS

The invention described herein may be manufactured, used, and licensed by or for the Government for governmental purposes without payment to me of any royalty thereon.

BACKGROUND OF THE INVENTION

1. Field of the Invention.

The invention is a device to train artillery crews who must learn the routine of loading and firing their weapon. Proper training requires that the environment simulate combat conditions as closely as possible. Actual combat rounds are expensive and increase the costs of training. Dummy rounds can be used to put crews through the motions of handling the weight, size, shape, etc., but lack the realism of recoil and counterrecoil barrel movement which crews must learn to cope with because that is what happens in combat. Ideally, crews in training should work with dummy rounds of realistic configuration, in artillery equipment items which move through the recoil and counterrecoil strokes as close to actual firing conditions as possible but without the expense of shooting up live ammunition.

2. Prior art.

Methods involve the defective techniques already outlined, often supplemented with the use of training films. Training films are almost always helpful, but will be more effective in conjunction with training exercises that closely approximate combat conditions. This becomes even more important when the need is to train gunners for tank combat, to which need the bounce, pitch, and roll of rough terrain is added along with all the other real life aggravations of gunnery crews adverted to above.

SUMMARY OF THE INVENTION

The invention proposes use of dummy rounds configured to closely approximate the weight, shape, balance, and overall "feel" of live rounds, having enough propellant to shoot the projectile clear of the muzzle with the barrel elevated. The setback force of firing such a small amount of propellant charge would not suffice to recoil the gun realistically. An electromagnetic sensor at the muzzle detects passage of the projectile and triggers an electrical control system for a hydraulic ram to move the barrel through the recoil-counterrecoil cycle each time a round is fired. A pump and accumulator combination provide the required source of hydraulic pressure, with a pressure sensitive power switch interrupting the power connection to the electric motor which drives the pump when system pressure reaches a predetermined value.

Newly manufactured equipment can be made integral with this invention at the time of manufacture if that is desired by drilling and tapping an oil hole in the gun mount. Alternatively, an externally mounted hydraulic jack may be secured to the recoil mechanism. Such a system can be provided in kit form for application to items already in the field.

The projectile uses a standard case and primer made as closely similar as possible to live rounds, except that training projectiles are modified to ride on the lands of the rifling in the gun tube. Because of the greatly reduced powder charge, the training projectile is made with a metal extension to simulate the powder weight.

The assembled training round thus has substantially the same weight and center of gravity as a live round for combat.

OBJECT

It is accordingly an object of this invention to provide a training device for artillery which uses a much less expensive round and which simulates recoil and counterrecoil of the gun carriage by use of a suitably connected hydraulic jack.

IN THE DRAWINGS

DESCRIPTION IN DETAIL OF FIG. 1

Figure 1:
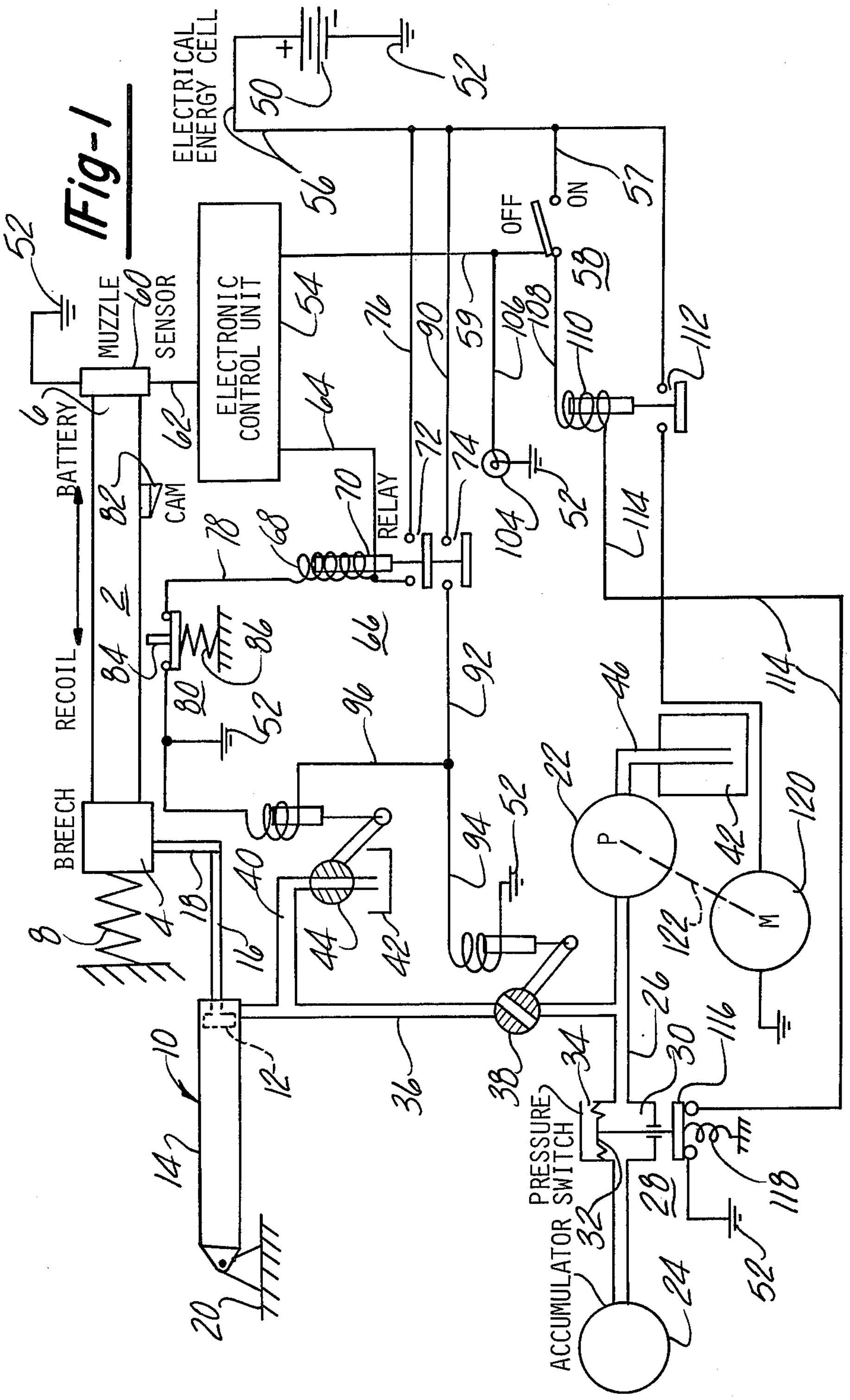
FIG. 1 is a schematic view of an artillery piece and the connected electric-over-hydraulic systems comprising the invention.

In the schematic representation here shown, a gun tube 2 is shown with its breech 4 on the observer's left and the muzzle 6 on the right. Tube 2 is a conventional artillery barrel and is conventionally mounted to recoil (leftward) to the rear and to counterrecoil (rightward) forward into battery, or firing position. A coil spring 8 is shown schematically arranged to be compressed elastically and thus store up energy during the recoil stroke of the firing cycle.

THE HYDRAULIC SYSTEM

The hydraulic system includes a conventional hydraulic jack 10, which comprises a piston 12, a cylinder 14, and a piston rod 16. Rod 16 is linked by any suitable means 18, sometimes termed a recoil lug, to the gun tube 2. Cylinder 14 reacts against a portion of the carriage shown at 20, so that oil admitted under pressure to the rod side of the piston moves piston 12 and the connected tube 2 leftward to simulate recoil.

A source of fluid under pressure is provided in the form of a pump 22 and an accumulator 24 connected by a conduit 26. A pressure responsive switch 28 having an operating chamber 30 in conduit 26 houses a movable operating element here shown as a diaphragm 32. As shown, the rod side of diaphragm 32 is exposed to the operating pressure of the source, and the opposite or upper surface of the diaphragm is vented to atmosphere by way of a vent 34.

A conduit 36 is joined with conduit 26 and taps into cylinder 14 at the rod end of the cylinder. A normally closed valve 38 is disposed in conduit 36. Another conduit 40 connects with conduit 36 and serves to communicate hydraulic cylinder 14 with the system reservoir 42 through a normally open valve 44. The circuit back to pump 22 is completed by an oil intake conduit 46.

THE ELECTRICAL SYSTEM

A conventional electrical energy cell 50, here shown as a storage battery, supplies the electric power for the tank; the system is grounded as indicated at 52. In keeping with current convention, the negative terminal of the battery is grounded. For the purpose of this patent application, it will be understood that, in describing electrical components, the term "positive terminal" will mean the terminal most closely connected, by wire or cable, with the source of electrical energy, while "grounded" will indicate a substantially no-voltage condition. An electronic control unit 54 is connected to a main power cable 56 by a wire 57, ON-OFF switch 58, and a wire 59. Unit 54 is conventional and may be any electrical device capable of receiving a relatively weak and short pulse signal as a trigger to produce a large enough pulse to operate a relay.

A sensor 60 is associated with the muzzle end 6 of tube 2. Sensor 60 may be, and preferably is, a multi-turn coil of wire capable of generating a voltage signal upon passage of a magnetic mass through it. A wire 62 connects unit 54 with sensor 60, and another wire 64 connects unit 54 with a relay 66. Relay 66 is conventional and comprises an electromagnetic coil 68, a plunger (or armature) 70, and two sets of normally open switching contacts 72 and 74 mechanically connected to and actuable by plunger 70.

As is evident from the drawing, wire 64 connects with one of the two sets of normally open contacts, said set being referenced by 72, and also connects with one end of coil 68. It is noted that unit 54 is connected with coil 68 at all times whether the set of contacts 72 is open or closed. The contact set 72 is connected with power cable 56 by a wire 76.

The remaining end of coil 68 is grounded through a wire 78 and a normally closed switch 80, which is adapted to be actuated into a circuit opening position as tube 2 reaches the end of recoil. Such actuating mechanism is here shown schematically as a cam 82 positioned to bear against a cam follower 84. A spring 86 is here shown as biasing the switch contacts closed.

Referring again to relay 66, the set 74 of normally open contacts is connected with power cable 56 by a wire 90, so that closing of the contact set 74 completes an electric circuit through the relay. A wire 92 connects contact set 74 with the coils of conventional solenoid operated valves 38 and 44 by means of two branch conductors 94 and 96.

The system "ON-OFF" switch 58 is connected with power cable 56 by wire 57 as aforesaid and with an indicator such as a lamp 104 by a wire 106. A wire 108 connects switch 58 with one end of a coil 110 of a solenoid-operated switch 112 disposed in cable 56. The remaining end of coil 110 is grounded through a wire 114 and a set of normally closed contacts 116 of pressure responsive switch 28. A tension spring 118 biases contacts 116 toward their normally closed position in opposition to the opening force exerted by diaphragm 32 in response to the pressure in chamber 30. Thus, energization of indicator 104 at least makes a prima facie showing that switch 58 is "ON".

A suitable electric motor 120 is mechanically connected as at 122 to drive pump 22. The electric power to drive motor 120 is supplied from energy cell 50 through power cable 56 and normally open power switch 112.

THE TRAINING ROUND—FIG. 2

A round of ammunition usable in gunnery crew training by means of the training equipment described above may take the form shown in FIG. 2. There shown is a round having a standard shell case 130, a primer 132, and a projectile 134 which is sized to ride on the rifling lands of the gun tube and carries an extension 136 of a configuration (shape and weight) such that, to the training crews who handle the rounds, it "feels" as nearly as possible like the live round the crews will work with in actual combat.

Inasmuch as the projectile 134 must pass through the sensor 60 to trigger operation of the recoil mechanism, the round is provided with enough powder to launch projectile 134 clear of tube 2 when the tube is elevated to the maximum angle to be used in training.

An alternative training round can be a more nearly conventional round which is loaded with a much less corrosive powder to propel the projectile.

AN ALTERNATIVE RECOIL SIMULATOR—FIG. 3

Figure 3:
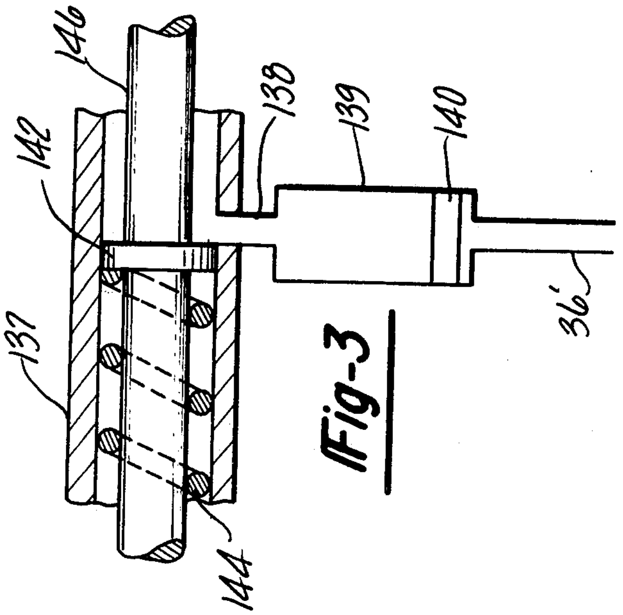
FIG. 3 is a longitudinal sectional view of a schematic drawing showing a hydraulic recoil mechanism modified to incorporate this invention.

The mechanism disclosed in FIG. 1 is not limited either to a modification of standard recoil mechanisms or to a totally separate system, often called a "kit". Rather, it is disclosed in broad terms applicable to either method. FIG. 3 shows how the recoil mechanism of an existing gun may be modified to simulate recoil by hydraulic means.

In FIG. 3, the hydraulic cylinder 137 which forms part of the conventional recoil mechanism is drilled and tapped to receive a conduit 138 connected with one end of a transfer cylinder 139 provided with a suitably packed floating piston 140. The lower end of transfer cylinder 139 is connected with conduit 36' from the pump, not shown in FIG. 3. Whether the cylinder or the piston rod moves with the recoiling tube may be termed "designer's choice". In FIG. 3, as in FIG. 1, it is assumed that the piston rod is secured to and moves with gun tube 2. In FIG. 3, conduit 138 is tapped into recoil cylinder 137 on the right side of piston 142 for recoil leftward against a recoil spring 144. Piston 142 is suitably secured on a piston rod 146, which in turn is secured in a conventional manner to the recoil lug.

AN ALTERNATIVE TRAINING ROUND—FIG. 4

Figure 4:
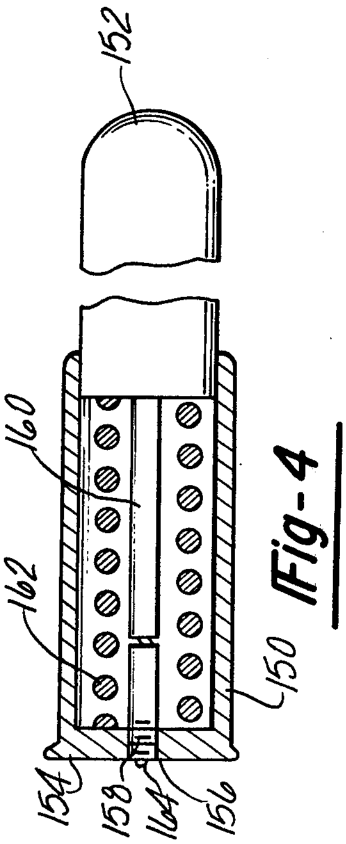
FIG. 4 shows another training round which does not use a combustible propellant.

A training round not dependent on a combustible propellant is shown in FIG. 4, comprising a simulated shell case 150 and a projectile 152. The base 154 is centrally tapped as at 156 to receive a threaded latch assembly 158 which is not detailed here. A central extension 160 is held in the position shown by latch assembly 158 and holds a coil spring 162 in a compressed state. A latch release pin 164 is adapted to be engaged by the firing pin to effectuate unlatching of the assembly 158 and extension 160. When spring 162 is compressed as shown, it should have enough stored energy to drive projectile 152 from tube 2 when the tube is elevated to the highest angle it will have during training exercises.

OPERATION

To prepare the system to simulate recoil, the gunnery instructor closes the operator-operable switch 58, which closes a circuit to activate the indicator 104 (here shown as a lamp), and simultaneously applies battery voltage to coil 110. If pressure sensitive switch 28 is closed because of insufficient pressure in accumulator 24, a circuit will be completed and switch 112 will be closed, completing a power circuit for motor 120. The motor drives pump 22 until the pressure in conduit 26 is high enough to open the normally closed contacts 116. Coil 110 is deenergized and the motor circuit is broken.

It is assumed that the firing mechanism is conventional and is not shown. Firing of the weapon causes primer ignition, and the training round expells projectile 134 with sufficient force to propel it out of tube 2. As the projectile 134 exits at the muzzle 6, it provokes a reaction by sensor 60 which sends a spike voltage to electronic control unit 54. Unit 54 amplifies the spike voltage and, via wire 64, sends a voltage to coil 68 of relay 66. An operating circuit is thus completed via wire 78 and normally closed switch 80.

As relay 66 is energized, it closes the normally open contacts 72 and 74. Closure of contacts 72 establishes a holding circuit for relay 66. Closure of contacts 74 energizes the solenoids of valves 38 and 44 by establishing circuits as follows: energy cell 50, cable 56, wire 90, contacts 74, wires 92 and 94, and the grounded coil of solenoid operated valve 38; energy cell 50, cable 56, wire 90, contacts 74, wires 92 and 96, and the grounded coil of solenoid operated valve 44. Normally closed valve 38 opens and normally open valve 44 closes.

A hydraulic circuit is thus completed between the source of fluid under pressure 24 and the hydraulic jack 10, as follows: accumulator 24, conduits 26 and 36, and cylinder 14 to the rod side of piston 12. Piston 12 moves leftward in cylinder 14 and carries gun tube 2 leftward to simulate the recoil which would have been accomplished by the recoil force of the burning of the propellant charge if a combat round had been fired.

As tube 2 reaches the end of its recoil stroke, cam 82 opens the normally closed switch 80 and opens the holding circuit for relay 66. Contacts 72 and 74 move to their normally open position; the opening of contacts 74 deenergizes the solenoids of solenoid-operated valves 38 and 44, returning them to their normally closed and normally open, respectively, positions. The hydraulic pressure connection to cylinder 14 is broken and simultaneously a connection is established to the hydraulic reservoir 42 via conduits 36 and 40 and normally open valve 44.

Spring 8, which during recoil was compressed to store up energy, is now free to expand to force the hydraulic jack 10 through its counterrecoil stroke and return the gun tube to its battery position.

In the event that operation of the system through the cycle just described lowers the line pressure so that the force of tension spring 118 of pressure-responsive switch 28 can overcome the force of the pressure in chamber 30, contacts 116 will reclose to reestablish a power circuit for motor 120, which again drives pump 22 to build up once more the pressure in conduit 26 and chamber 30 to a value high enough to operate the simulated recoil mechanism, and to open contacts 116.

Figure 2:
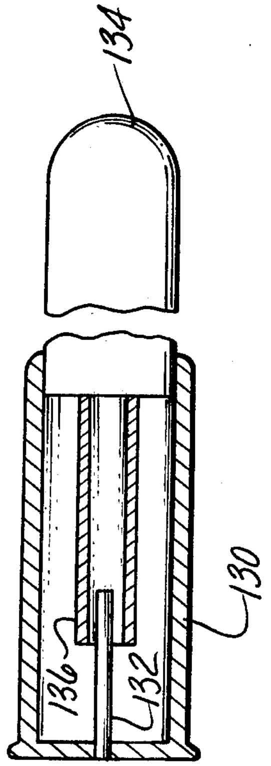
FIG. 2 is a partial longitudinal section through a training round to be used with the invention.

Operation of the training rounds shown in FIGS. 2 and 4 will be readily apparent to persons skilled in the art, and no detailed description of the operation of those two disclosures will be provided.

Regarding the embodiment shown in FIG. 3, it suffices to point out that this embodiment is a form which the invention can readily take at the time the artillery piece is manufactured. The hydraulic cylinder shown at 137 is the recoil cylinder of the gun. Because the hydraulic fluid of recoil mechanisms tends to be contaminated and it is desirable to keep such contamination out of pumps, transfer cylinder 139 is provided to keep the fluid of the two systems separate.

I wish it to be understood that I do not desire to be limited to the exact details of construction shown and described for obvious modifications will occur to a person skilled in the art.

What is claimed is:

1. A loader-trainer for an artillery piece having a barrel mounted to reciprocate between its firing position and its fully recoiled position, and means to move the barrel through recoil and counterrecoil including an expansible chamber device reciprocable through a two-stroke cycle and a spring connected to store energy by elastic deformation through one of the strokes of said cycle and to return the stored energy to move the barrel through the other stroke of the two-stroke cycle, the invention comprising: an electrical energy cell; a source of fluid under pressure including a pump and an accumulator; an electric motor connected to drive the pump; a normally closed electric switch responsive to pressure in the accumulator and openable when accumulator pressure reaches a predetermined maximum; a normally open solenoid-operated power switch for the electric motor and actuable into closed-circuit position by energization of its solenoid; an operating circuit comprising a series connection of the energy cell, the solenoid of said power switch, and said pressure-responsive switch; a hydraulic connection from the accumulator to the expansible chamber device and including a normally closed valve connected to a solenoid energizable to open its connected valve; a hydraulic connection from the expansible chamber device to the pump via a reservoir and including a normally open valve connected to a solenoid energizable to close its connected valve; an electrical sensor to sense the passing of a projectile out through the muzzle end of the artillery piece; electrical means connected to receive a signal from said sensor, to energize the solenoids of the normally closed valve and the normally open valve to actuate the expansible chamber device for movement of the barrel from its firing position into its fully recoiled position; a normally closed recoil-opened switch in the electrical means and openable to deenergize the solenoids of the normally closed valve and the normally open valve; and means actuable by barrel movement to the fully recoiled position to open the normally closed recoil-opened switch in said electrical means.

2. A loader-trainer as in claim 1, wherein said electrical means connected to receive a signal includes an electric circuit comprising the electrical energy cell, a relay having normally open contacts, and the solenoid of the normally closed valve; and another electric circuit comprising the electrical energy cell, said relay having normally open contacts, and the solenoid of the normally open valve.

3. In a loader-trainer as in claim 2, a second set of normally open contacts on said relay, a solenoid plunger on the relay mechanically connected to open and close both sets of said normally open contacts and a coil having an electrical connection with one set of said normally open contacts, whereby an electric circuit is formed comprising the electrical energy cell, said second set of normally open contacts, the coil of the relay, and the normally closed recoil-opened switch.

4. A loader-trainer as in claim 3, in which the electrical means includes an electronic control unit connected to receive pulse signals from the sensor, each such pulse signal serving to close a circuit through the electronic control unit whereby an electric circuit is completed including the electrical energy cell, the electronic control unit, the solenoid coil of said relay, and the normally closed recoil-opened switch, the last-named electric circuit constituting a holding circuit for the relay.

5. A loader-trainer as in claim 1, in which the electrical means includes an electronic control unit connected to receive pulse signals from the sensor to close a circuit through the electronic control unit and through the normally closed recoil-opened switch.

6. In a loader-trainer as in claim 5, a relay having an operating solenoid coil and a set of normally open contacts actuable to a closed position by energization of the relay; means electrically connecting one end of the solenoid coil with one side of said set of normally open contacts and also to receive a voltage output of the electronic control unit; means electrically connecting the other end of the solenoid coil with the normally closed recoil-opened switch; and means connecting the other side of said set of normally open contacts with the electrical energy cell, whereby closure of the normally open relay contacts establishes an electric circuit which includes the electrical energy cell, the closed normally open relay contacts, the solenoid coil, and the normally closed recoil-opened switch.

* * * * *